(12) United States Patent
Chen et al.

(10) Patent No.: US 9,894,367 B2
(45) Date of Patent: Feb. 13, 2018

(54) MULTIMEDIA DEVICE AND MOTION ESTIMATION METHOD THEREOF

(75) Inventors: Yen-Sung Chen, New Taipei (TW); Yu-Shu Liu, Hsinchu (TW); Tsui-Chin Chen, Hsinchu (TW); Chun Wang, Shanghai (CN); Jian-De Jiang, Shaanxi (CN)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 580 days.

(21) Appl. No.: 13/402,861

(22) Filed: Feb. 22, 2012

(65) Prior Publication Data

US 2012/0213284 A1    Aug. 23, 2012

(30) Foreign Application Priority Data

Feb. 23, 2011    (TW) .............................. 100106066 A

(51) Int. Cl.
*H04N 7/26* (2006.01)
*H04N 11/00* (2006.01)
(Continued)

(52) U.S. Cl.
CPC ......... *H04N 19/157* (2014.11); *H04N 19/172* (2014.11); *H04N 19/51* (2014.11); *H04N 19/521* (2014.11)

(58) Field of Classification Search
CPC ...... H04N 7/50; H04N 5/145; H04N 7/26765; H04N 7/26244; H04N 7/361;
(Continued)

(56) References Cited

U.S. PATENT DOCUMENTS 5,151,784 A    9/1992   Lavagetto et al.
2003/0227973 A1*  12/2003  Nishibori et al. ....... 375/240.16
(Continued)

FOREIGN PATENT DOCUMENTS

CN    1750660 A    3/2006
CN    101616247 A  12/2009

OTHER PUBLICATIONS

Taiwanese Office Action dated Jun. 26, 2014.

*Primary Examiner* — Gims Philippe
*Assistant Examiner* — On S Mung
(74) *Attorney, Agent, or Firm* — Rabin & Berdo, P.C.

(57) ABSTRACT

A motion estimation method is provided for generating a motion vector of a to-be-generated frame between two continuous reference frames. The method includes the following steps. A candidate motion vector is obtained according to the position of a to-be-generated block of a to-be-generated frame. Two first reference blocks are obtained from the two reference frames by extending the candidate motion vector from the to-be-generated block to the two reference frames, respectively. Two second reference blocks are obtained from the two reference frames by extending the candidate motion vector from one reference frame to another reference frame. Whether the candidate motion vector is valid is determined according to the positions of the two reference blocks obtained in each obtaining step. The corresponding motion vector of the to-be-generated block is determined according to the valid candidate motion vector.

10 Claims, 5 Drawing Sheets

(51) Int. Cl.
  *H04N 19/157* (2014.01)
  *H04N 19/172* (2014.01)
  *H04N 19/51* (2014.01)
  *H04N 19/513* (2014.01)

(58) Field of Classification Search
  CPC .... H04N 19/172; H04N 19/51; H04N 19/157; H04N 19/521
  USPC .................................................. 375/240.16
  See application file for complete search history.

(56) References Cited

U.S. PATENT DOCUMENTS

| | | | |
|---|---|---|---|
| 2004/0101058 A1* | 5/2004 | Sasai et al. | 375/240.26 |
| 2007/0086526 A1* | 4/2007 | Koto | H04B 1/662 |
| | | | 375/240.16 |
| 2007/0237232 A1* | 10/2007 | Chang et al. | 375/240.16 |
| 2008/0117977 A1* | 5/2008 | Lee et al. | 375/240.16 |
| 2008/0187048 A1* | 8/2008 | Baik et al. | 375/240.16 |
| 2010/0054336 A1* | 3/2010 | Okumura | G09G 3/20 |
| | | | 375/240.16 |

\* cited by examiner

MULTIMEDIA DEVICE AND MOTION ESTIMATION METHOD THEREOF

This application claims the benefit of Taiwan application Serial No. 100106066, filed Feb. 23, 2011, the subject matter of which is incorporated herein by reference.

BACKGROUND OF THE INVENTION

Field of the Invention

The invention relates in general to an electronic device and a control method thereof, and more particularly to a multimedia device and a motion compensation method thereof.

Description of the Related Art

In response to the requirement of liquid crystal TV, more and more researches are focused in the field of motion estimation/motion compensation (ME/MC). Motion compensation is an algorithmic technique employed in the encoding of video data for video compression.

In general, motion estimation refers to a method for determining motion vectors from adjacent frames. The motion vectors describe the transformation from one frame to another. The motion vector can relate to the whole frame (global motion estimation) or specific parts thereof, such as rectangular blocks, arbitrary shaped patches or even per pixel. Furthermore, applying the motion vectors to a frame to synthesize the transformation to another frame is called motion compensation. The combination of motion estimation and motion compensation is a commonly used technology in image compression.

According to motion estimation/motion compensation, two frames to be displayed on the screen are analyzed, and a middle state of the two frames is estimated through calculation. That is, an interpolation frame is generated between the two frames. Referring to FIG. 1, a schematic diagram of an example of generating a middle frame by way of motion estimation/motion compensation is shown. Firstly, moving objects such as an object Obj on the two frames I-frame and P-frame are located by using motion estimation algorithm. Next, a motion vector MV, which denotes the movement path of the object Obj on the frame, is calculated according to the difference between the two frames I-frame and P-frame. Then, motion compensation algorithm is used for estimating the middle state of the moving object Obj according to the motion vector MV and the two frames I-frame and P-frame, thus generating an interpolation frame M-frame.

However, as regards blocks which are adjacent to a valid range of a frame, there often are problems in the estimation of the motion vector. For example, when a moving object is located around edges of a frame, such as a moving object moving into the range of the frame or leaving the range of the frame, the position of the object cannot be found in continuous frames. Consequently, applicable motion vectors cannot be generated, the accuracy in estimation is reduced, and the quality in frame interpolation deteriorates.

SUMMARY OF THE INVENTION

The invention is directed to a multimedia device for generating a motion vector of a middle frame between two frames and a motion compensation method thereof capable of generating an applicable motion vector for increasing the accuracy in the estimation of the motion vector and improving the quality in frame interpolation.

According to an aspect of the present invention, a multimedia device is provided for generating a motion vector of a to-be-generated frame between two continuous reference frames. The multimedia device includes a motion vector obtaining unit, a validity verifying unit, and a motion vector determining unit. The motion vector obtaining unit obtains a candidate motion vector according to a position of a to-be-generated block in a to-be-generated frame. The validity verifying unit includes a first reference block obtaining circuit, a second reference block obtaining circuit, and a validity verifying circuit. The first reference block obtaining circuit obtains two first reference blocks from the two reference frames by pointing the candidate motion vector from the to-be-generated block to the two reference frames. The second reference block obtaining circuit obtains two second reference blocks from the two reference frames by pointing the candidate motion vector from one of the two reference frames to another one of the two reference frames. The validity verifying circuit determines whether the candidate motion vector is valid according to the positions of the two reference blocks obtained by each reference block obtaining circuit. The motion vector determining unit determines the corresponding motion vector of the to-be-generated block according to the valid candidate motion vector.

According to an alternative aspect of the present invention, a motion estimation method is provided for generating a motion vector of a to-be-generated frame between two continuous reference frames. The method includes the following steps. A candidate motion vector is obtained according to a position of a to-be-generated block in a to-be-generated frame. Two first reference blocks are obtained from a forward frame and a backward frame by pointing the candidate motion vector from the forward frame to the backward frame. Two second reference blocks are obtained from the forward frame and the backward frame by pointing the candidate motion vector from the backward frame to the forward frame. Whether the candidate motion vector is valid is determined according to positions of the two reference blocks obtained in each obtaining step. The corresponding motion vector of the to-be-generated block is determined according to the valid candidate motion vector.

According to another alternative aspect of the present invention, a motion estimation method is provided for generating a motion vector of a to-be-generated frame between two continuous reference frames. The method includes the following steps. A candidate motion vector is obtained according to a position of a to-be-generated block in a to-be-generated frame. A position of a reference block of a reference frame is obtained according to the candidate motion vector. Whether the position of the reference block obtained according to the candidate motion vector is located within a predetermined frame range is determined. If the position of the reference block obtained according to the candidate motion vector is located within the predetermined frame range, then the candidate motion vector is determined as valid. The corresponding motion vector of the to-be-generated block is determined according to the valid candidate motion vector.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
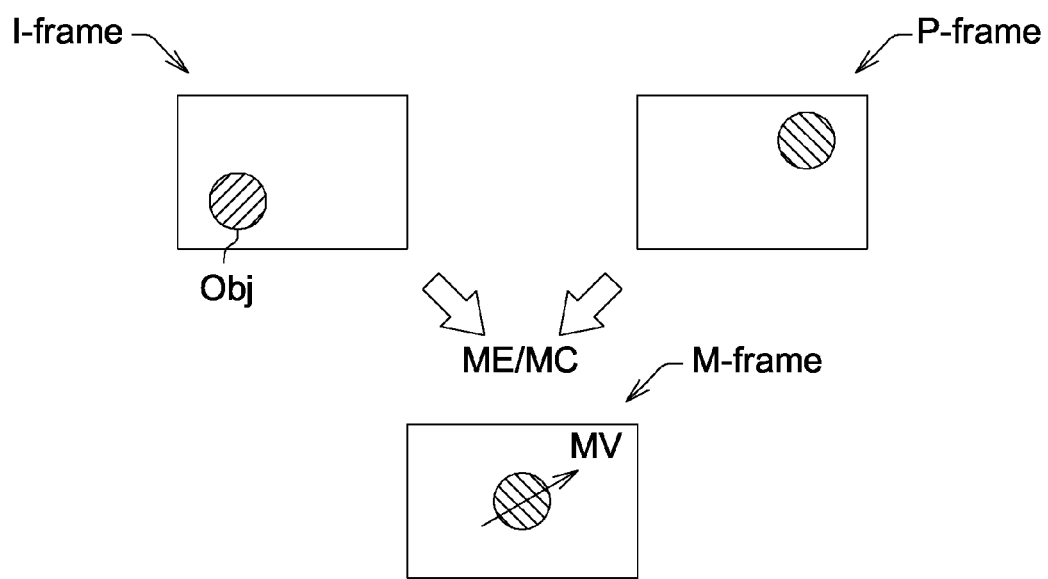
FIG. 1 shows a schematic diagram of an example of generating a middle frame by way of motion estimation/motion compensation algorithm.
Figure 2:
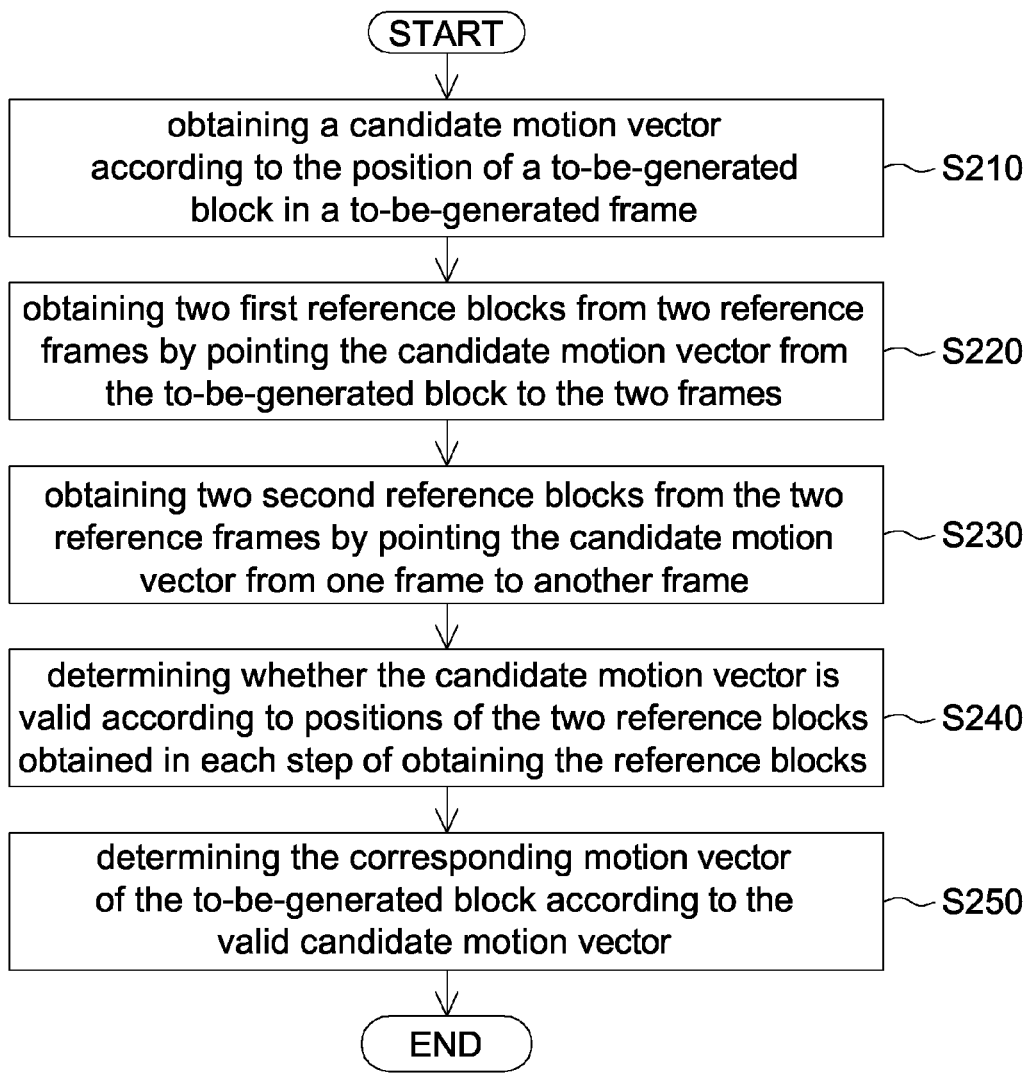
FIG. 2 shows a flowchart of an example of a motion estimation method according to an embodiment of the invention.

Referring to FIG. 2, a flowchart of an example of a motion estimation method according to an embodiment of the invention is shown. The motion estimation method is provided for generating a motion vector of a to-be-generated frame between two continuous reference frames. The method includes the following steps. In step S210, a candidate motion vector is obtained according to the position of a to-be-generated block in a to-be-generated frame. In step S220, two first reference blocks are obtained from the two reference frames by pointing the candidate motion vector from the to-be-generated block to the two reference frames. In step S230, two second reference blocks are obtained from the two reference frames by pointing the candidate motion vector from one of the two frames to another one of the two frames. In step S240, whether the candidate motion vector is valid is determined according to positions of the two reference blocks obtained in each obtaining step. In step S250, the corresponding motion vector of the to-be-generated block is determined according to the valid candidate motion vector.

According to the motion estimation method disclosed in the embodiments of the invention, different reference blocks can be obtained according to a candidate motion vector. From these reference blocks, two reference blocks making the candidate motion vector be determined as valid can be selected for increasing the accuracy in the estimation of the motion vector. Thus, an applicable motion vector can be identified. In this way, when motion compensation is performed, the applicable motion vector can be used for performing interpolation for improving the quality in frame interpolation. An embodiment of a multimedia device using the motion estimation method is disclosed below for exemplification purpose.

Figure 3:
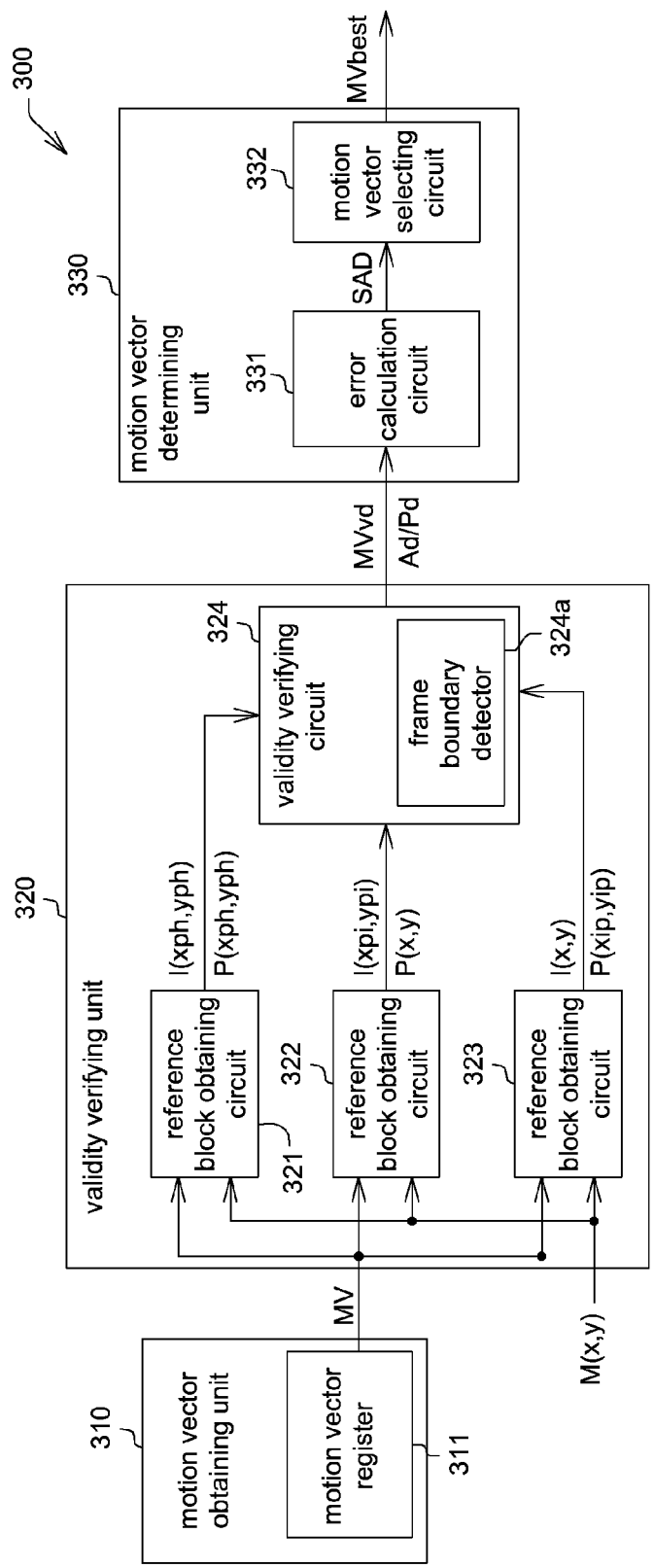
FIG. 3 shows a block diagram of an example of a multimedia device according to an embodiment of the invention.
Figure 4A:
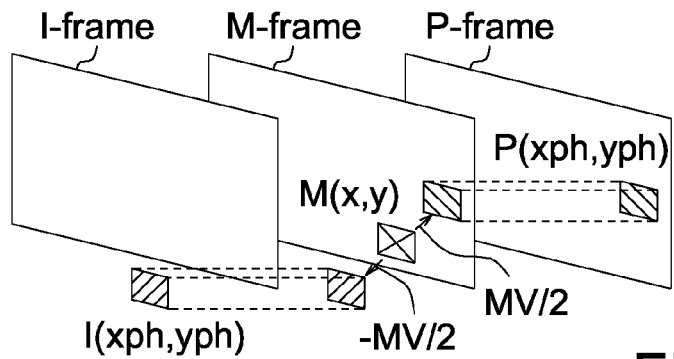
FIGS. 4A~4C respectively show a schematic diagram of an example of obtaining the reference block by the multimedia device of FIG. 3 according to candidate motion vector.
Figure 4B:
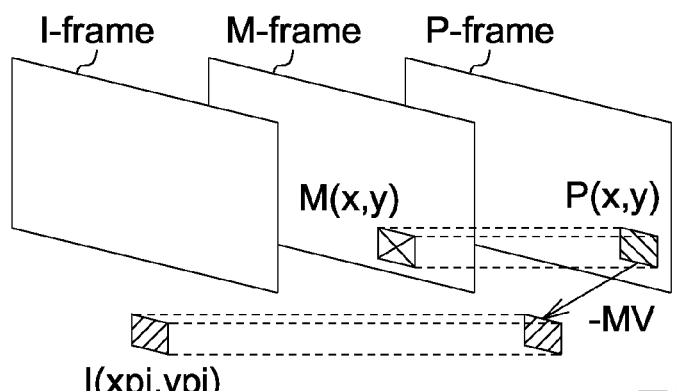
Figure 4C:
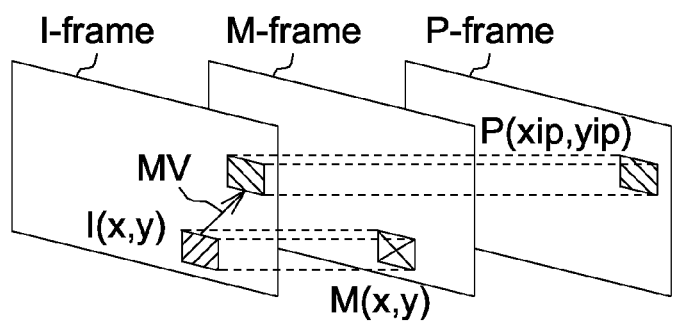

Referring to FIGS. 3, and 4A~4C. FIG. 3 shows a block diagram of an example of a multimedia device according to an embodiment of the invention. FIGS. 4A~4C respectively show a schematic diagram of an example of obtaining the reference blocks by the multimedia device of FIG. 3 according to a candidate motion vector. The multimedia device 300 is provided for generating a motion vector of a to-be-generated frame M-frame between two continuous reference frames in the aforementioned motion estimation method. In the present embodiment, the two reference frames are exemplified by a forward frame I-frame and a backward frame P-frame of the to-be-generated frame M-frame. The multimedia device 300 can for example include a motion vector obtaining unit 310, a validity verifying unit 320, a motion vector determining unit 330. The operation relationships among the units are disclosed below.

The motion vector obtaining unit 310 obtains a candidate motion vector MV according to a position of a to-be-generated block M(x,y) in the to-be-generated frame M-frame. In an embodiment, the motion vector obtaining unit 310 includes a motion vector register 311 which provides several candidate motion vectors with respect to the position of the to-be-generated block M(x,y) in the to-be-generated frame M-frame. The candidate motion vectors include several spatial and temporal motion vectors related of the to-be-generated block M(x,y). The candidate motion vectors provided by the motion vector register 311 include a motion vector of a block I(x,y) in the forward frame I-frame whose location is corresponding to the position of the to-be-generated block M(x,y), and other motion vectors of several blocks surrounding the block I(x,y). For example, as regards the position of the to-be-generated block M(x,y) in the to-be-generated frame, the motion vector register 311 can use as a center the block I(x,y) having substantially a same position in the forward frame I-frame, and obtain motion vectors of n×m blocks containing the block I(x,y). In an embodiment, the candidate motion vectors provided by the motion vector register 311 can further include some motion vectors which are generated at random. The motion vector obtaining unit 310 sequentially obtains a candidate motion vector MV from the candidate motion vectors, and provides the selected candidate motion vector to the validity verifying unit 320.

The validity verifying unit 320 determines whether the candidate motion vector MV of the to-be-generated block M(x,y) is valid. The validity verifying unit 320 can for example include three reference block obtaining circuits 321~323 and a validity verifying circuit 324. The three reference block obtaining circuits 321~323 obtain different reference blocks according to the candidate motion vector MV of the to-be-generated frame M(x,y), and are described with reference to FIGS. 4A~4C respectively.

As indicated in FIG. 4A, the reference block obtaining circuit 321 obtains two reference blocks I(xph,yph) and P(xph-yph) by pointing the candidate motion vector MV from the to-be-generated block M(x,y) to the two reference frames, e.g., the forward frame I-frame and the backward frame P-frame, respectively. In the present example, the two reference blocks I(xph,yph) and P(xph-yph) can be obtained from the to-be-generated block M(x,y) by multiplying the motion vector MV with two coefficients (such as +MV/2 and −MV/2; +MV/4 and −3MV/4) which are two positive/negative fractional numbers.

As indicated in FIG. 4B, the reference block obtaining circuit 322 obtains two reference blocks P(x,y) and I(xpi, ypi) by pointing the candidate motion vector MV from the backward frame P-frame to the forward frame I-frame. In the present embodiment, the reference block P(x,y), from which the motion vector MV points another the reference block I(xpi, ypi) has a position which corresponds to the position of the to-be-generated block M(x,y). Thus, two reference blocks P(x,y) and I(xpi,ypi) different from the aforementioned reference blocks I(xph,yph) and P(xph-yph) can be obtained.

As indicated in FIG. 4C, the reference block obtaining circuit 323 obtains two reference blocks I(x,y) and P(xip, yip) by pointing the candidate motion vector MV from the forward frame I-frame to the backward frame P-frame. In the present embodiment, the reference block I(x,y), from which the motion vector MV points another the reference block P(xip, yip) has a position which corresponds to the position of the to-be-generated block M(x,y). Thus, two reference blocks I(x,y) and P(xip,yip) different from the aforementioned two reference blocks I(xph,yph) and P (xph-yph) as well as two reference blocks P(x,y) and I(xpi,ypi) can be obtained.

The validity verifying unit 324 determines whether the candidate motion vector MV is valid according to positions of the two reference blocks obtained by each reference block obtaining circuit. In an embodiment, the validity verifying unit 324 determines whether the candidate motion vector MV is valid according to whether at least one of the reference blocks obtained according to the candidate motion vector MV is outside a predetermined frame range. The way for determining whether a reference block is outside a predetermined frame range can be designed according to actual needs. In an embodiment, the validity verifying unit 324 can determine whether a block is outside a predetermined frame range according to a number of pixels outside the predetermined frame range for each reference block. For example, when the number of pixels outside the predetermined frame range is over a threshold for the block obtained according to the candidate motion vector MV, then the block is determined as outside the predetermined frame range. In another embodiment, the validity verifying circuit 324 determines whether a block is outside a predetermined frame range according to at least one of the position of each block and the size of the corresponding candidate motion vector MV. For example, when the position of the block obtained according to the candidate motion vector MV is close to edges of the predetermined frame range, and the candidate motion vector MV is high in magnitude, then it is determined that the block is outside the predetermined frame range.

Moreover, the validity verifying circuit 324 can for example include a frame boundary detector 324a. The predetermined frame range can be selected from an actual size of reference frame I-frame or P-frame such as 1920*1080, or a frame rim smaller than the actual size. The frame rim can be implemented by a range not containing the top/down or left/right black bars at edges of a frame, or a range of a frame not containing information such as captions, film tiles, or image providers' logos. However, the invention is not limited to the above exemplifications, and the predetermined frame range can also be designed according to actual needs.

In practical application, obtaining blocks by the reference block obtaining circuit 321 can be described as a block identification algorithm of phase loop; obtaining blocks by the reference block obtaining circuit 322 can be described as a block identification algorithm of P-to-I; and obtaining blocks by the reference block obtaining circuit 323 can be described as a block identification algorithm of I-to-P. Through the use of different block identification algorithms, different reference blocks can be obtained, and two of them can be found capable of making the candidate motion vector MV be determined as valid, so as to increase the accuracy in the estimation of the motion vector. In other words, when the validity verifying circuit uses one block identification algorithm and finds that a position of an identified reference block is not applicable to locating a suitable motion vector, the validity verifying circuit will use another block identification algorithm to obtain other reference blocks. In the present embodiment of the invention, applicable motion vectors can be obtained for increasing the accuracy in the estimation of the motion vector.

In an embodiment, when the validity verifying circuit 324 fails in determining the candidate motion vector MV as valid according to two reference blocks, the validity verifying circuit 324 determines whether the candidate motion vector MV is valid according to another two reference blocks. For example, suppose the predetermined frame range is the actual size of a frame. As indicated in FIG. 4A, refer to the reference blocks I(xph,yph) and P (xph,yph), where the reference block I(xph,yph) is outside the predetermined frame range and cannot make the candidate motion vector MV be determined as valid. In this case, the validity verifying circuit 324 will use another two reference blocks P(x,y) and I(xpi,ypi) to determine the validity of the candidate motion vector MV. As indicated in FIG. 4B, since the reference block I(xpi,ypi) is outside the predetermined frame range and cannot make the candidate motion vector MV be determined as valid, the validity verifying circuit 324 use another two reference blocks I(x,y) and P (xip,yip). As indicate din FIG. 4C, since the reference blocks I(x,y) and P (xip,yip) are both not outside the predetermined frame range, the validity verifying circuit 324 determines the candidate motion vector MV as valid.

In the present embodiment of the invention, three reference block obtaining circuits 321~323 are used as an exemplification. However, in other embodiments, of the three reference blocks obtaining circuits, any two of them such as the reference block obtaining circuit 321 and 322 can also be used, but the invention is not limited to the above exemplification. Thus, several reference blocks obtained by the by reference block obtaining circuit can be provided for determining the validity of the candidate motion vector MV so that the accuracy in the estimation of the motion vector can be increased. Then, the validity verifying circuit 324 delivers the memory address Ad or pixel data Pd of the valid candidate motion vector MVvd and the corresponding reference blocks such as reference blocks I(x,y) and P (xip,yip) to the motion vector determining unit 330.

The motion vector determining unit 330 determines the motion vector of the to-be-generated block M(x,y) according to the valid candidate motion vector MVvd. In an embodiment, the motion vector determining unit 330 can for example include an error calculation circuit 331 and a motion vector selecting circuit 332. The error calculation circuit 331 calculates an error SAD between two blocks corresponding to the valid candidate motion vector MVvd, wherein the error SAD is for example the sum of absolute differences. For example, as indicated in FIG. 4C, the candidate motion vector MV is determined as valid by the validity verifying circuit 324 in view of the two blocks I(x,y) and P (xip,yip), so the error calculation circuit 331 calculates the error of the two blocks I(x,y) and P (xip,yip). Then, with respect to several candidate motion vectors provided by the motion vector register 311, the error calculation circuit 331 will generate corresponding error SAD for each valid candidate motion vector. Afterwards, the motion vector selecting circuit 332 selects the candidate motion vector MV with least error as the corresponding motion vector of the to-be-generated block M(x,y).

Figure 5:
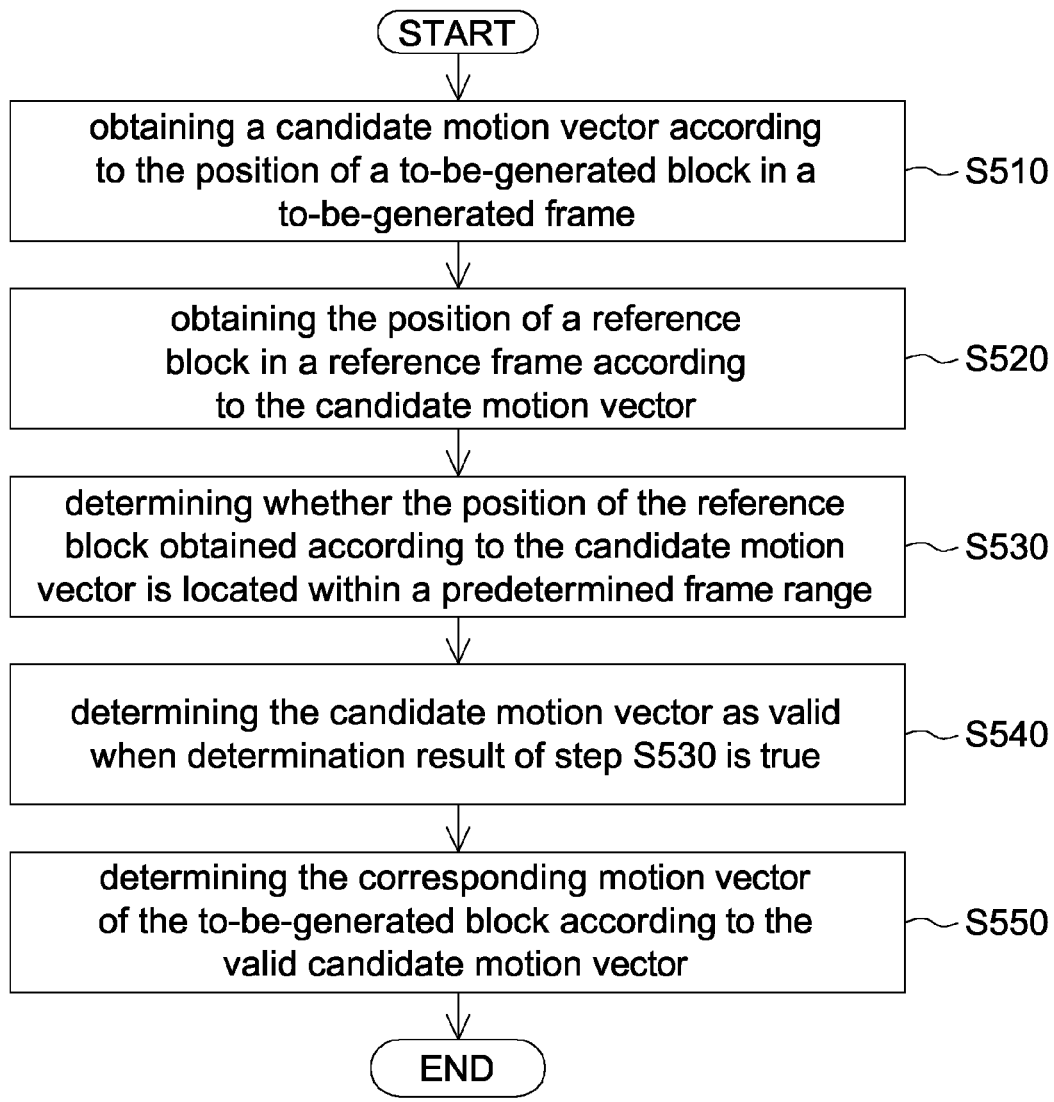
FIG. 5 shows a flowchart of an example of a motion estimation method according to an embodiment of the invention.

Referring to FIG. 5, a flowchart of an example of a motion estimation method according to an embodiment of the invention is shown. The motion estimation method is for generating a motion vector of a to-be-generated frame between continuous multiple frames. The method includes the following steps. In step S510, a candidate motion vector is obtained with respect to the position of a to-be-generated block in a to-be-generated frame. In step S520, the position of a reference block of a reference frame is obtained according to the candidate motion vector, wherein the reference frame is for example a forward frame or a backward frame of the to-be-generated frame. In step S530, it is determined whether the position of the reference block obtained according to the candidate motion vector is located within a predetermined frame range. In step S540, if it is determined that the position of the reference block obtained according to the candidate motion vector is located within the predetermined frame range, then the candidate motion vector is determined as valid. In step S550, according to the valid candidate motion vector, the corresponding motion vector of the to-be-generated block is determined according to the valid candidate motion vector. Anyone who is skilled in the technology of the invention will understand that detailed operations in each step of the method, and detailed descriptions are thus omitted for the sake of brevity.

According to the multimedia device and the motion estimation method disclosed in the embodiments of the invention, in view of a candidate motion vector of a to-be-generated block, different block identification algorithms are used to obtain different reference blocks. Among them, two reference blocks can be found capable of making the candidate motion vector be determined as valid. As such, the accuracy in the estimation of the motion vector can be increased, and the quality in frame interpolation can be improved.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multimedia device for generating a motion vector of a to-be-generated frame between two continuous reference frames, wherein the multimedia device comprises:
   a motion vector obtaining unit for obtaining a candidate motion vector according to a position of a to-be-generated block in a to-be-generated frame;
   a validity verifying unit, comprising:
      a first reference block obtaining circuit for obtaining two first reference blocks from the two reference frames by pointing the candidate motion vector from the to-be-generated block to the two reference frames, wherein a distance between the two first reference blocks is represented by the candidate motion vector;
      a second reference block obtaining circuit for obtaining two second reference blocks from the two reference frames by pointing the candidate motion vector from one of the two reference frames to another one of the two reference frames, wherein a distance between the two second reference blocks is represented by the candidate motion vector; and
      a validity verifying circuit, including a frame boundary detector, for determining whether the candidate motion vector is valid, wherein the candidate motion vector is valid if at least one of the following two conditions is met:
      (a) positions of the two first reference blocks are both inside a predetermined frame range;
      (b) positions of the two second reference blocks are both inside the predetermined frame range,
      wherein the predetermined frame range is selected as either an actual size of the reference frames or a frame rim smaller than the actual size; and
   a motion vector determining unit for performing block matching on either the two first reference blocks or the two second reference blocks based on the candidate motion vector when the candidate motion vector is determined as valid by the validity verifying unit, to determine the motion vector of the to-be-generated block.

2. The multimedia device according to claim 1, wherein the motion vector obtaining unit comprises:
   a motion vector register for providing a plurality of candidate motion vectors with respect to the position of the to-be-generated block in the to-be-generated frame, wherein the candidate motion vectors include a plurality of spatial and temporal motion vectors of the to-be-generated block, and the motion vector obtaining unit sequentially obtains the candidate motion vectors.

3. The multimedia device according to claim 2, wherein the motion vector determining unit comprises:
   an error calculation circuit for calculating an error between two blocks corresponding to the valid candidate motion vector; and
   a motion vector selecting circuit for selecting the candidate motion vector with least error as the motion vector of the to-be-generated block.

4. The multimedia device according to claim 1, wherein of the two second reference blocks, one, from which the motion vector points to another, has a position which corresponds to the position of the to-be-generated block.

5. A motion estimation method for generating a motion vector of a to-be-generated frame between two continuous frames, the two continuous frames comprising a forward frame and a backward frame, wherein the method comprises:
   obtaining a candidate motion vector according to a position of a to-be-generated block in a to-be-generated frame;
   obtaining two first reference blocks by pointing the candidate motion vector from the forward frame to the backward frame, wherein one of the two first reference blocks is in the forward frame, and the other one of the two first reference blocks is in the backward frame;
   obtaining two second reference blocks by pointing the candidate motion vector from the backward frame to the forward frame, wherein one of the two second reference blocks is in the forward frame, and the other one of the two second reference blocks is in the backward frame;
   determining whether the candidate motion vector is valid, wherein the candidate motion vector is valid if at least one of the following two conditions is met:
   (a) positions of the two first reference blocks are both inside a predetermined frame range;
   (b) positions of the two second reference blocks are both inside the predetermined frame range, wherein the predetermined frame range is selected as either an actual size of the frames or a frame rim smaller than the actual size; and
   when the candidate vector is determined as valid in the step of determining, performing block matching on either the two first reference blocks or the two second reference blocks based on the valid candidate motion vector, to determine the motion vector of the to-be-generated block.

6. The motion estimation method according to claim 5 further comprising:
   obtaining two third reference blocks from the forward frame to the backward frame by pointing the candidate motion vector to the forward frame and the backward frame from the to-be-generated block.

7. The motion estimation method according to claim 5 wherein, of the two first reference blocks, one, from which the motion vector points to another, has a position which corresponds to the position of the to-be-generated block;

wherein, of the two second reference blocks, one, from which the motion vector points to another, has a position which corresponds to the position of the to-be-generated block.

8. A motion estimation method for generating a motion vector of a to-be-generated frame between two continuous frames, wherein the method comprises:

obtaining a candidate motion vector according to a position of a to-be-generated block in a to-be-generated frame;

obtaining two first reference blocks and two second reference blocks in the frames according to the candidate motion vector, wherein positions of the two first reference blocks are different from positions of the two second reference blocks, a distance between the two first reference blocks is represented by the candidate motion vector, and a distance between the two second reference blocks is represented by the candidate motion vector;

determining whether the candidate motion vector is valid, wherein the candidate motion vector is valid if at least one of the following two conditions is met:

(a) the positions of the two first reference blocks are both inside a predetermined frame range;

(b) the positions of the two second reference blocks are both inside the predetermined frame range, wherein the predetermined frame range is selected as either an actual size of the frames or a frame rim smaller than the actual size; and when the candidate vector is determined to be valid in the step of determining, performing block matching on either the two first reference blocks or the two second reference blocks based on the valid candidate motion vector, to determine the motion vector of the to-be-generated block.

9. The motion estimation method according to claim 8, wherein, in the step of determining whether the candidate motion vector is valid, the determination is made according to a number of pixels outside the predetermined frame range for at least one of the two first reference blocks and the two second reference blocks.

10. The motion estimation method according to claim 8, wherein, in the step of determining whether the candidate motion vector is valid, the determination is made according to at least one of the size of the corresponding candidate motion vector and the position of at least one of the two first reference blocks and the two second reference blocks.

* * * * *